Feb. 27, 1962          J. P. SIMON          3,022,683

TRANSMISSION FOR VEHICLES

Original Filed Oct. 18, 1956          3 Sheets-Sheet 1

Inventor:
John P. Simon

Inventor:
John P. Simon

Feb. 27, 1962 J. P. SIMON 3,022,683
TRANSMISSION FOR VEHICLES
Original Filed Oct. 18, 1956 3 Sheets-Sheet 3

Inventor:
John P. Simon
Paul O. Pippel
Atty.

3,022,683
Patented Feb. 27, 1962

3,022,683
TRANSMISSION FOR VEHICLES
John P. Simon, Glen Ellyn, Ill., assignor to International Harvester Company, a corporation of New Jersey
Continuation of application Ser. No. 616,829, Oct. 18, 1956. This application Mar. 30, 1959, Ser. No. 803,050
14 Claims. (Cl. 74—759)

This invention relates to transmissions and is primarily concerned with a transmission for vehicles. This application is a continuation of my application Serial No. 616,829 filed October 18, 1956, now abandoned.

An object of the invention is to provide a transmission having low rotational speeds of moving parts.

Another object of the invention is to provide a transmission having similar forward and reverse output shaft speeds.

A further object of the invention is to provide a transmission having a greater variation of speeds of the output shaft than transmissions used in the past.

A still further object of the invention is to provide a transmission wherein there can be obtained a two to one ratio of input shaft speed to output shaft speed using planetary gearing.

Figure 1:
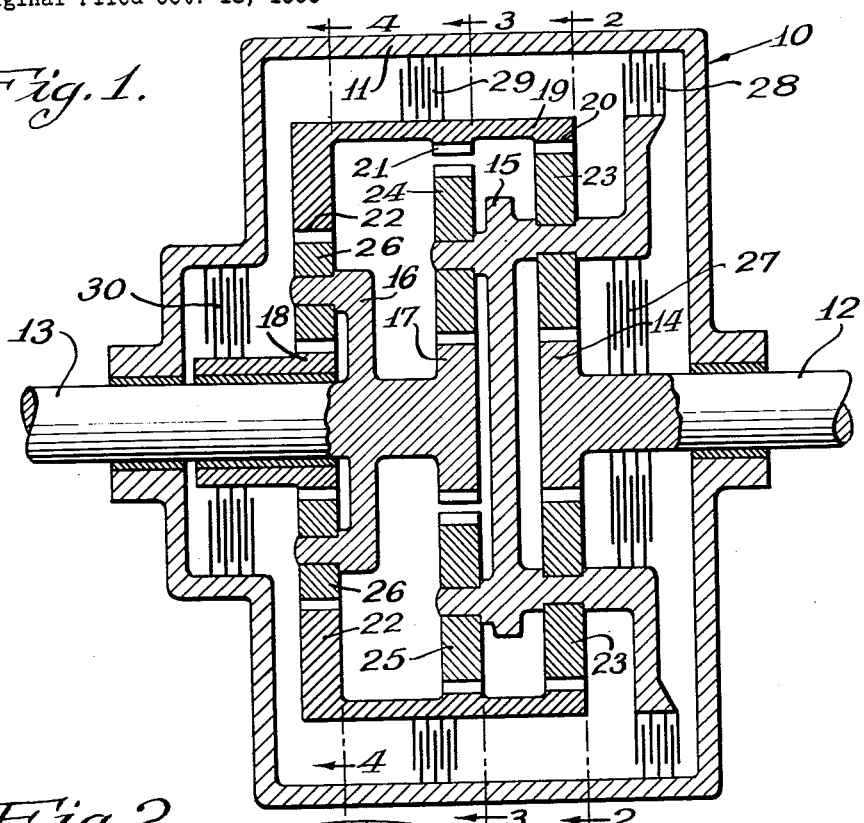
Figure 2:
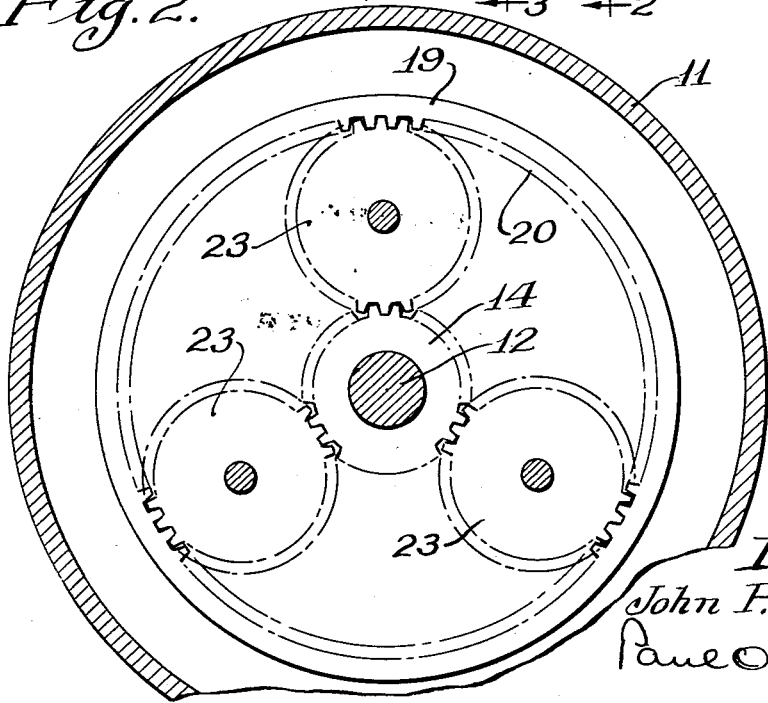
Figure 3:
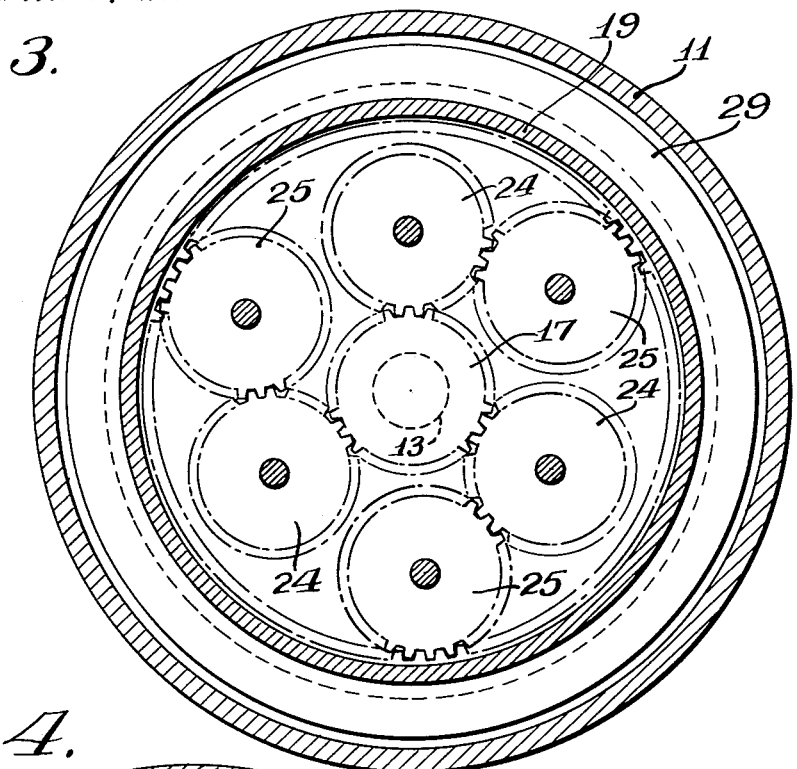
Figure 4:
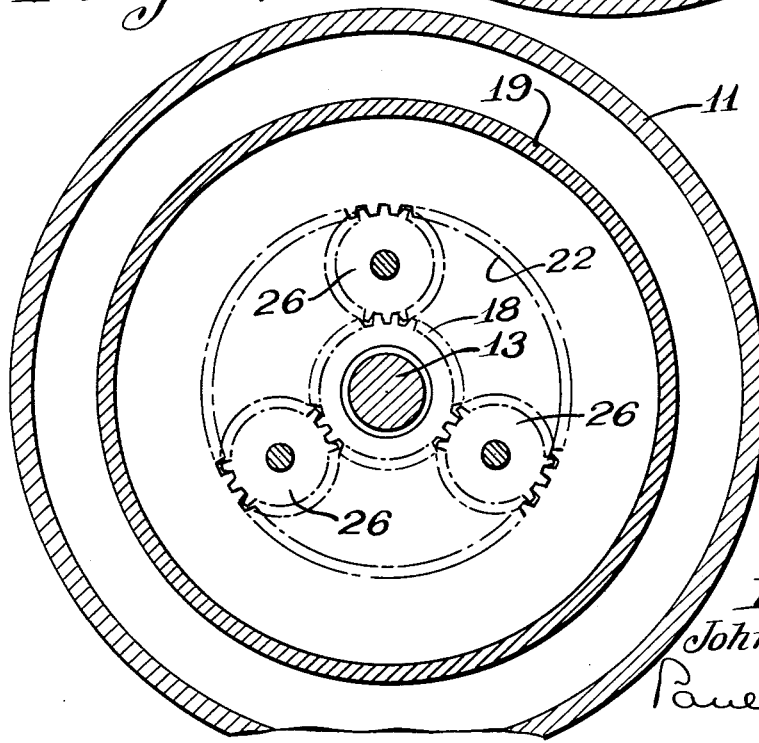
Figure 5:
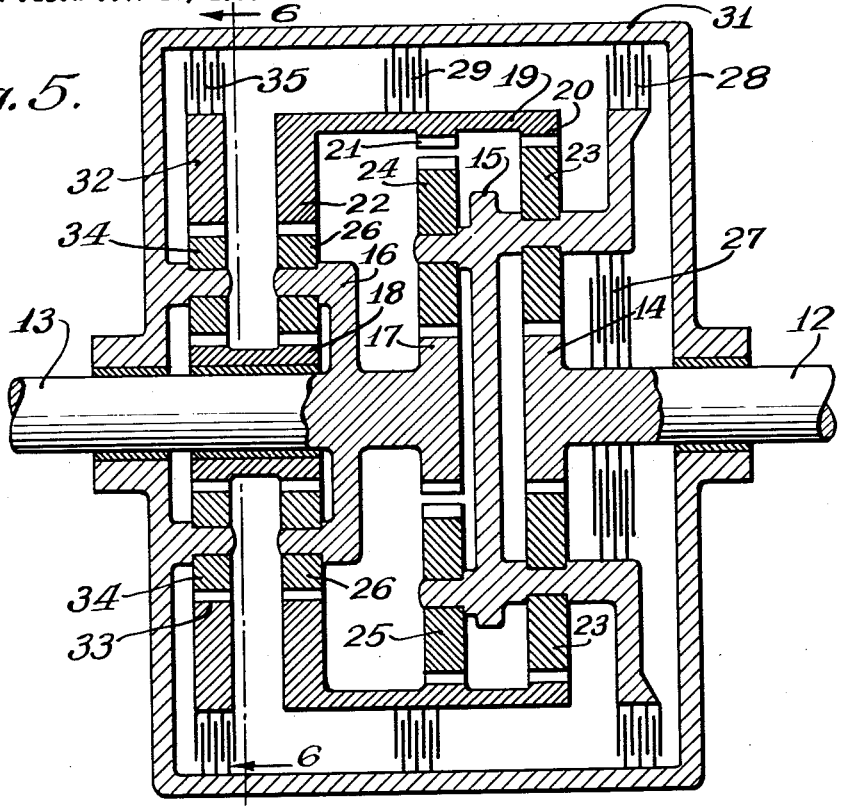
Figure 6:
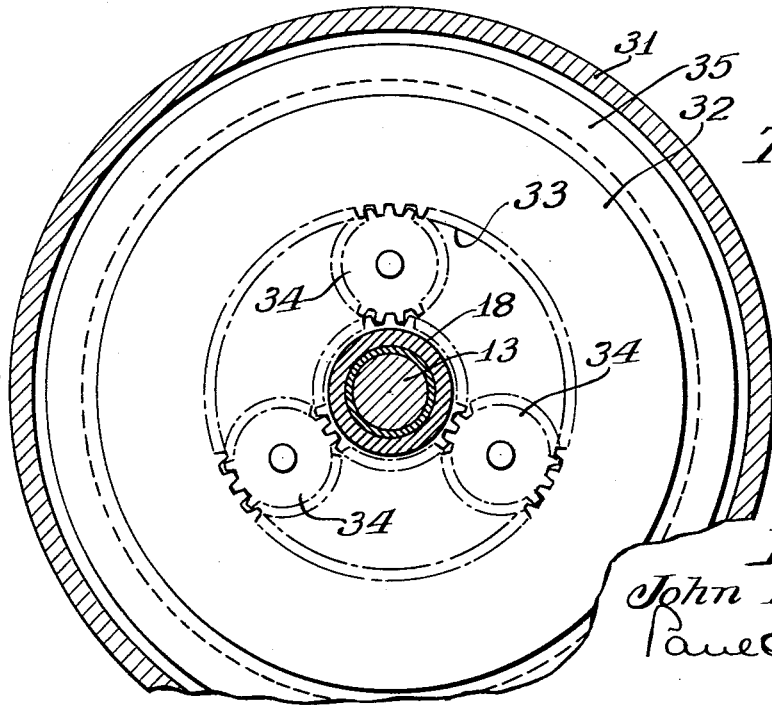

The foregoing and other objects of the invention will be apparent from the construction and arrangement illustrated in the accompanying drawings wherein:

FIGURE 1 is a cross sectional view through one form of the transmission of the present invention, FIGURE 2 is a cross sectional view taken on the line 2—2 of FIGURE 1, FIGURE 3 is a cross sectional view taken on the line 3—3 of FIGURE 1, FIGURE 4 is a cross sectional view taken on the line 4—4 of FIGURE 1, FIGURE 5 is a cross sectional view through a modified form of transmission, and FIGURE 6 is a cross sectional view taken on the line 6—6 of FIGURE 5.

The invention proposes an improved transmission. The transmission is comprised of a casing and an input shaft operatively connected to a source of power and an output shaft and a gear fixedly secured on the input shaft and a gear fixedly secured on the output shaft and a gear rotatably mounted on the output shaft. A first planetary gear set meshes with the gear on the input shaft and a second planetary gear set meshes with the gear fixedly secured on the output shaft and a third planetary gear set meshes with the gear rotatably mounted on the output shaft. A clutch is mounted between the first, second and third planetary gear sets and the input shaft. A pair of brakes are mounted between the first, second and third planetary gear sets and the casing and a third brake is mounted between the gear rotatably mounted on the output shaft and the casing. This transmission has the advantages of similar forward and reverse output shaft speeds and low rotational speeds of moving parts and a greater variation of speeds of the output shaft. With this transmission it is possible to obtain a two to one ratio of input shaft speed to output shaft speed using planetary gearing.

In the drawings referring first to FIGURES 1 to 4 inclusive 10 generally designates a transmission for a vehicle such as a tractor or highway truck. The transmission 10 is comprised of a casing 11 and an input shaft 12 is rotatably mounted on bearings in the casing and is operatively connected to a source of power such as the engine of the tractor or truck. An output shaft 13 is rotatably mounted on bearings in the casing 11 in end to end spaced relation with respect to the input shaft 12. A spur gear 14 having 26 teeth is formed integral with the input shaft 12. A carrier 15 is disposed in the casing 11 adjacent the adjacent ends of the input and output shafts 12 and 13 and another carrier 16 is fixedly secured on the output shaft. A spur gear 17 having 26 teeth is formed integral with the end of the output shaft 13 and a spur gear or sun gear 18 having 24 teeth is rotatably mounted on bearings on the output shaft between the carrier 16 and the casing 11. An orbit wheel 19 is disposed in the casing 11 and has three spaced sets of internal gear teeth 20, 21 and 22. Each of the sets 20 and 21 has 88 teeth and set 22 has 60 teeth. A plurality of spur gears 23 each having 31 teeth are rotatably mounted on the carrier 15 and mesh with the gear 14 on the input shaft and the set of teeth 20 on the orbit wheel. A plurality of spur gears 24 each having 29 teeth are rotatably mounted on the carrier 15 and mesh with the gear 17 on the output shaft and a plurality of spur gears 25 each having 29 teeth are rotatably mounted on the carrier and mesh with the gears 24 and the set of teeth 21 on the orbit wheel. A plurality of spur gears 26 each having 18 teeth are rotatably mounted on the carrier 16 and mesh with the gear 18 on the output shaft and the set of teeth 22 on the orbit wheel. A clutch 27 is disposed between the input shaft and the carrier 15. A brake 28 is mounted between the carrier 15 and the casing 11 and a brake 29 is mounted between the orbit wheel 19 and the casing and a brake 30 is mounted between the gear 18 and the casing 11. This transmission has two speeds forward and two speeds reverse.

The operation of the transmission shown in FIGURES 1 to 4 inclusive is as follows: With only the brake 28 engaged and brakes 29, 30, and clutch 27 disengaged, the carrier 15 is held stationary and gear 14 drives through idler gears 23 to rotate orbit wheel 19. The set of teeth 21 on orbit wheel 19 drives gear 17 and the output shaft through gears 24 and 25. Gears 18 and 26 and the set of teeth 22 on the orbit wheel are idle. The rotation of the output shaft 13 is in a direction reverse of the rotation of the input shaft 12. With the brake 29 engaged and brakes 28, 30, and clutch 27 disengaged, the orbit wheel 19 is held stationary. Gear 14 drives gears 23 around the set of teeth 20 moving carrier 15 causing gears 25 to revolve around the set of teeth 21 and drive gear 17 and the output shaft through gears 24. Gears 18, 26 and the set of teeth 22 are idle. The rotation of the output shaft is in a direction reverse of the rotation of the input shaft. With the clutch 27 engaged and brakes 28, 29 and 30 disengaged, the carrier 15 is locked to the input shaft 12 thereby locking all gears in all planetaries to the input shaft. The output shaft 13 rotates the same speed and in the same direction as the input shaft 12. With the brake 30 engaged and brakes 28, 29, and clutch 27 disengaged, gear 18 is held stationary and carrier 16 drives gears 26 around gear 18 overdriving the orbit wheel 19. Rotation of the orbit wheel 19 together with rotation of gear 14 causes coincident rotation of carrier 15 driving gears 25 around inside of moving orbit wheel 19 and driving gear 17 and the output shaft 13 through gears 24. The rotation of the output shaft 13 is then partly regenerated through the planetary gear set 18, 22, 26. The regenerative action provides additional speed reducing effect. The rotation of the output shaft is in the same direction as the rotation of the input shaft. Comprehension of the rather complex gear train which is in operation for obtaining this forward reduced drive connection may be facilitated by considering first the condition that would prevail if the ring wheel 19 were somehow caused to rotate at the same speed as the driving sun gear 14. Under this assumed condition the planet gears 23 would not rotate about their axes, the carrier 15 would be rotated at the same speed as the driving sun gear 14 and as the ring wheel 19 and therefore the idler planet gears 25 would be revolved about the carrier axis but would be held against rotation about their own axes and would constrain the idler planet gears 24 against rotation about their own axes so that as they are carried by the rotating carrier to revolve about the carrier axis these gears 24 act as keys to cause the driven sun gear 17 to rotate at carrier speed. Thus if the ring wheel 19 were rotated at the same forward speed as the driving sun gear 14 there would be a condition tantamount to the carrier 15 and planetary gear sets associated therewith being locked up so all elements of these planetary gear sets have no relative movement and rotate as a unit about the common axis of the shafts 12 and 13. If, while said elements are thus rotating as a unit, the ring wheel 19 were to be rotated at some faster speed while the driving sun gear 14 continued at the same speed, the ring wheel 19 would rotate at an overspeed relative to the carrier 15. This would cause the ring gear 20 to rotate the planet gears 23 reactively against the driving sun gear 14 to rotate the carrier 15 forwardly at an overspeed less than that of the ring wheel 19 relatively to the driving sun gear because of the gear 20 having greater diameter than said driving sun gear. Concurrently, the ring gear 21 would continue to rotate faster than the carrier 15 and this relative rotation of the ring gear 21 and the carrier would cause such ring gear to be effective through the planet idler gears 25 and 24 to rotate the driven sun gear 17 at an underspeed relatively to the carrier that exceeds the overspeed of ring gear 21 relatively to the carrier because of the ring gear having more teeth than the driven sun gear. The net effect of the overspeed ring 19 causing some increase in speed of the carrier 15 over the speed of driving sun gear 14 and diminution in speed of the driven sun gear 17 greater than the speed increase of the carrier 15 is to cause this driven sun gear to be driven at diminished speed with respect to the drive gear 14 and drive shaft 12. The amount of this speed reduction of the driven sun gear and of the driven shaft 13 is a direct function of the overspeed of the ring wheel 19, which overspeed, in the present case, is determined by the relative diameter of the sun gear 18 and ring gear 22 of the planetary gear train 18, 26, 22 for driving the ring wheel 19 at an overspeed from the driven shaft 13.

A modified form of transmission having two speeds forward and two speeds reverse is shown in FIGURES 5 and 6. The transmission is the same as that shown in FIGURES 1 to 4 inclusive except that the shape of the casing has been changed and the brake 30 has been shifted to a different position and a gear set has been added. The modified transmission has a casing 31 and an orbit wheel 32 having internal gear teeth 33 and a plurality of spur gears 34 are rotatably mounted on the casing and mesh with the orbit wheel and the gear 18 and a brake 35 is mounted between the orbit wheel and the casing. The orbit wheel 32 has 60 gear teeth and each gear 34 has 18 teeth. The operation of this transmission with the clutch 27 and brakes 28 and 29 engaged is the same as for the first form of transmission and engagement of brake 35 holds orbit wheel 32, gears 34 and gear 18 stationary and the movement of the rest of the gears and carriers is the same as described for the first form of transmission. The advantage of the form of FIGURES 5 and 6 is that the discs of brakes 28, 29 and 35 are all of the same diameter and therefore may be interchanged.

The transmission shown in the drawings have the characteristics shown in the table below with the input shaft speed at 1600 r.p.m.

| Clutch or brake engaged | Ratio of output shaft speed to input shaft speed | R.p.m. of output shaft |
| --- | --- | --- |
| Brake 30 | .47 | 750 |
| Clutch 27 | 1.0 | 1,600 |
| Brake 29 | −.54 | [1] −865 |
| Brake 28 | −1.0 | [1] −1,600 |

[1] The negative (−) sign represents r.p.m. in the reverse direction.

These transmissions have a greater variation of speeds of the output shaft because the planetary gear sets 14, 23 and 18, 26 can easily be changed. With this transmission it is possible to obtain a two to one ratio of input shaft speed to output shaft speed using planetary gearing as can be seen from the table. These transmissions provide similar forward and reverse output shaft speeds as can also be seen from the table.

Each output shaft speed selected requires the engagement of only one drive effecting element, i.e. a clutch or brake in contrast to the usual two drive effecting elements concurrently. This simplifies the valve used for control of the transmission and reduces the shift shock often caused by two drive effecting elements coming into or going out of engagement.

What is claimed is:

1. A transmission comprising a casing, an input shaft rotatably mounted in the casing and operatively connected to a source of power, an output shaft rotatably mounted in the casing in longitudinally aligned relation with the input shaft, a gear with external teeth fixedly secured on the input shaft, a gear with external teeth fixedly secured on the output shaft, a gear rotatably mounted on the output shaft, a first planetary gear set having a planet gear meshing with the gear on the input shaft, a second planetary gear set having a planet gear meshing with the gear fixedly secured on the output shaft, said first and second gear sets having a common carrier, a third planetary gear set meshing with the gear rotatably mounted on the output shaft, ring gears operatively connected to the planet gears of the first, second and third gear sets, means including a clutch operatively connected between the carrier of the first and second planetary gear sets and the input shaft, a first brake operative between the carrier and the casing, a second brake operative between the ring gears and the casing, and means comprising a brake operative between the gear rotatably mounted on the output shaft and the casing.

2. A transmission comprising a casing, an input shaft rotatably mounted in the casing and operatively connected to a source of power, an output shaft rotatably mounted in the casing in end to end spaced relation with the input shaft, a spur gear fixedly secured on the input shaft, a first carrier disposed in the casing adjacent said ends of the input and output shafts, a second carrier fixedly secured on the output shaft, a spur gear fixedly secured on said end of the output shaft, a spur gear rotatably mounted on the output shaft between the second carrier and the casing, an orbit wheel disposed in the casing and having a first and second and a third set of internal teeth arranged in spaced relation, a first plurality of spur gears rotatably mounted on the first carrier and meshing with the gear on the input shaft and the first set of teeth on the orbit wheel, a second plurality of spur gears rotatably mounted on the first carrier and meshing with the gear fixedly secured on the output shaft, a third plurality of spur gears rotatably mounted on the first carrier and meshing with the second plurality of spur gears and the second set of teeth on the orbit wheel, a fourth plurality of spur gears rotatably mounted on the second carrier and meshing with the gear rotatably mounted on the output shaft and the third set of teeth on the orbit wheel, a clutch drivingly connectible between the input shaft and the first carrier, a first brake operatively connectible between the first carrier and the casing, a second brake operatively connectible between the orbit wheel and the casing, and a third brake operative to stop rotation of the gear rotatably mounted on the output shaft.

3. A transmission comprising a casing, an input shaft rotatably mounted in the casing and operatively connected to a source of power, an output shaft rotatably mounted in the casing in end to end spaced relation with the input shaft, a spur gear fixedly secured on the input shaft, a first carrier disposed in the casing adjacent said ends of the input and output shafts, a second carrier fixedly secured on the output shaft, a spur gear fixedly secured on said end of the output shaft, a spur gear rotatably mounted on the output shaft between the second carrier and the casing, a first orbit wheel disposed in the casing and having a first and a second and a third set of internal teeth arranged in spaced relation, a first plurality of spur gears rotatably mounted on the first carrier and meshing with the gear on the input shaft and the first set of teeth on the first orbit wheel, a second plurality of spur gears rotatably mounted on the first carrier and meshing with the gear fixedly secured on the output shaft, a third plurality of spur gears rotatably mounted on the first carrier and meshing with the second plurality of spur gears and the second set of teeth on the first orbit wheel, a fourth plurality of spur gears rotatably mounted on the second carrier and meshing with the gear rotatably mounted on the output shaft and the third set of teeth on the first orbit wheel, a second orbit wheel disposed in the casing and having a set of internal teeth, a fifth plurality of spur gears rotatably mounted on the casing and meshing with the gear rotatably mounted on the output shaft and the teeth on the second orbit wheel, a clutch drivingly connectible between the input shaft and the first carrier, a first brake operatively connectible between the first carrier and the casing, a second brake operatively connectible between the first orbit wheel and the casing, and a third brake operatively connectible between the second orbit wheel and the casing.

4. In a speed reduction driving connection between a pair of shafts, sun gears respectively fixed for rotation with said shafts, ring gears respectively complemental with said sun gears and interconnected for rotation in unison, a carrier structure, a first set of planet gears journalled for rotation on the carrier structure and meshing with one of the sun gears fixed to one of said shafts and also meshing with the ring gear complemental thereto, a planetary idler gear journalled upon the carrier structure and meshing with the other sun gear in driving relation therewith, a second planetary idler gear journalled upon the carrier structure and meshing with the first planetary idler gear and also with the ring gear complemental to said other sun gear, selectively braked reaction means and means driven by the other shaft and the reaction means and drivingly connected with the ring gears to effect rotation thereof in the same direction as said other shaft is driven.

5. The combination set forth in claim 4 wherein the means for driving the ring gears constitutes gear means for driving the ring gears at an overspeed with respect to said other shaft.

6. The combination set forth in claim 4 wherein the reaction means comprises a sun gear and the means for driving the ring gears from said other shaft comprises a carrier constrained for rotation with said other shaft, planet gears journalled upon such carrier and meshing with said last mentioned sun gear and a ring gear meshing with the planet gears and drivingly connected with said ring gears.

7. The combination set forth in claim 4 wherein the reaction means comprises a sun gear, and means for driving the ring gears constitutes gear means for driving the ring gears at an overspeed with respect to said other shaft and brake means for preventing rotation of said last named sun gear.

8. In a change speed transmission between a pair of shafts and having a casing, sun gears respectively fixed for rotation with said shafts, ring gears respectively complemental with said sun gears and interconnected for rotation in unison, a carrier structure, a first set of planet gears journalled for rotation on the carrier structure and meshing with one of the sun gears fixed to one of said shafts and also meshing with the ring gear complemental thereto, a planetary idler gear journalled upon the carrier structure and meshing with the other sun gear in driving relation therewith, a second planetary idler gear journalled upon the carrier structure and meshing with the first planetary idler gear and also with the ring gear complemental to said other sun gear, a further sun gear and means driven by the other shaft and drivingly connectible with the further sun gear and the ring gears, brake means for selectively connecting said last named sun gear to the casing and brake means for alternatively connecting the ring gears to the casing.

9. The combination set forth in claim 8 wherein there is also brake means for selectively connecting the carrier structure to the casing when the other two brake means are disengaged.

10. The combination set forth in claim 9 wherein there is a clutch selectively operable to connect the said carrier with the one shaft when all three brake means are disengaged.

11. In a transmission having input and output shafts, each of said shafts having a sun gear constrained for rotation therewith, ring gears complemental with said sun gears, compounded planetary gearing including a first pinion meshing with the sun gear on the input shaft and the ring gear complemental thereto and a second pinion meshing with the sun gear on the output shaft and a third pinion meshing with the second pinion and the ring gear complemental thereto, and a carrier structure mounting the said pinions, a gear rotatably mounted on the ouput shaft, first means operatively connected with the ring gears and the gear rotatably mounted on the shaft, second means including a clutch operative between the carrier and the input shaft, and brake means selectively operative to brake the carrier, the ring gears, and the gear rotatably mounted on the shaft.

12. The invention according to claim 11 and said brake means cooperative with said gear rotatably mounted on the output shaft comprising a pinion meshing with said last named gear, a ring gear meshing with said pinion and a brake for preventing rotation of the ring gear.

13. The invention according to claim 11 and said first means including a carrier constrained for rotation with the output shaft and planet gears journalled upon said last named carrier and meshing with the gear rotatably mounted on the output shaft and a ring gear meshing with the planet gears and drivingly connected with said ring gears.

14. A transmission comprising a casing and input shaft rotatably mounted in the casing and operatively connected to a source of power, an output shaft rotatably mounted in the casing, a gear fixedly secured on the input shaft, a gear fixedly secured on the output shaft, a gear rotatably mounted on the output shaft, a first planetary gear set having a planet gear meshing with the gear on the input shaft, a second planetary gear set having a planet gear meshing with the gear fixedly secured on the output shaft, said first and second gear sets having a common carrier, said output shaft including means carrying a third planetary gear set having a planet gear meshing with the gear rotatably mounted on the output shaft, ring gears operatively connected to the planet gears of the first and third gear sets, means meshing the gear of the second gear set with the ring gears, means including a clutch operatively connected between the carrier and the input shaft, a first brake operative between the carrier and the casing, a second brake operative between the ring gears and the casing, and means comprising a brake operative between the casing and the gear rotatably mounted on the output shaft.

References Cited in the file of this patent
UNITED STATES PATENTS

| | | |
|---|---|---|
| 2,580,891 | Clerk | Jan. 1, 1952 |
| 2,869,400 | Langdon | Jan. 20, 1959 |